United States Patent
Nedelman

(10) Patent No.: US 8,596,703 B2
(45) Date of Patent: Dec. 3, 2013

(54) RETRACTABLE ROD ENDS FOR LIFTGATE MOUNTED CARGO SHADE

(75) Inventor: Marc David Nedelman, Waterford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 201 days.

(21) Appl. No.: 13/314,271

(22) Filed: Dec. 8, 2011

(65) Prior Publication Data

US 2013/0147225 A1 Jun. 13, 2013

(51) Int. Cl.
*B60R 5/04* (2006.01)
(52) U.S. Cl.
USPC ............ 296/24.43; 296/37.16; 280/749; 160/272
(58) Field of Classification Search
USPC ............ 296/24.43, 24.4, 37.16; 280/749; 160/272; 410/146, 149
See application file for complete search history.

(56) References Cited

U.S. PATENT DOCUMENTS

| 3,279,529 | A | | 10/1966 | Smith et al. | |
|---|---|---|---|---|---|
| 5,224,748 | A | * | 7/1993 | Decker et al. | 296/37.16 |
| 5,676,415 | A | * | 10/1997 | Ament et al. | 296/37.16 |
| 5,813,449 | A | | 9/1998 | Patmore et al. | |
| 7,337,823 | B2 | | 3/2008 | Wieczorek et al. | |
| 7,591,296 | B2 | | 9/2009 | Busha et al. | |
| 2011/0048658 | A1 | | 3/2011 | Nedelman et al. | |
| 2012/0091745 | A1 | * | 4/2012 | Cha et al. | 296/37.16 |

* cited by examiner

*Primary Examiner* — Joseph Pape
(74) *Attorney, Agent, or Firm* — Vichit Chea; Price Heneveld LLP

(57) ABSTRACT

A cargo shade or cover for a vehicle includes a thin flexible member that winds onto an elongated roller. The elongated roller may be mounted on a movable vehicle component such as a liftgate of an SUV. An elongated rod assembly is attached to the thin flexible member, and includes extending and retracting end portions that can be received in cavities or other connectors of the vehicle interior to retain the cover in an extended position. The rod assembly may include center housing and a pulley that can be rotated to generate tension on cables that pull the opposite ends of the rod inwardly whereby the rod assembly can be positioned between vehicle interior components when the cover assembly is in the retracted position.

20 Claims, 4 Drawing Sheets

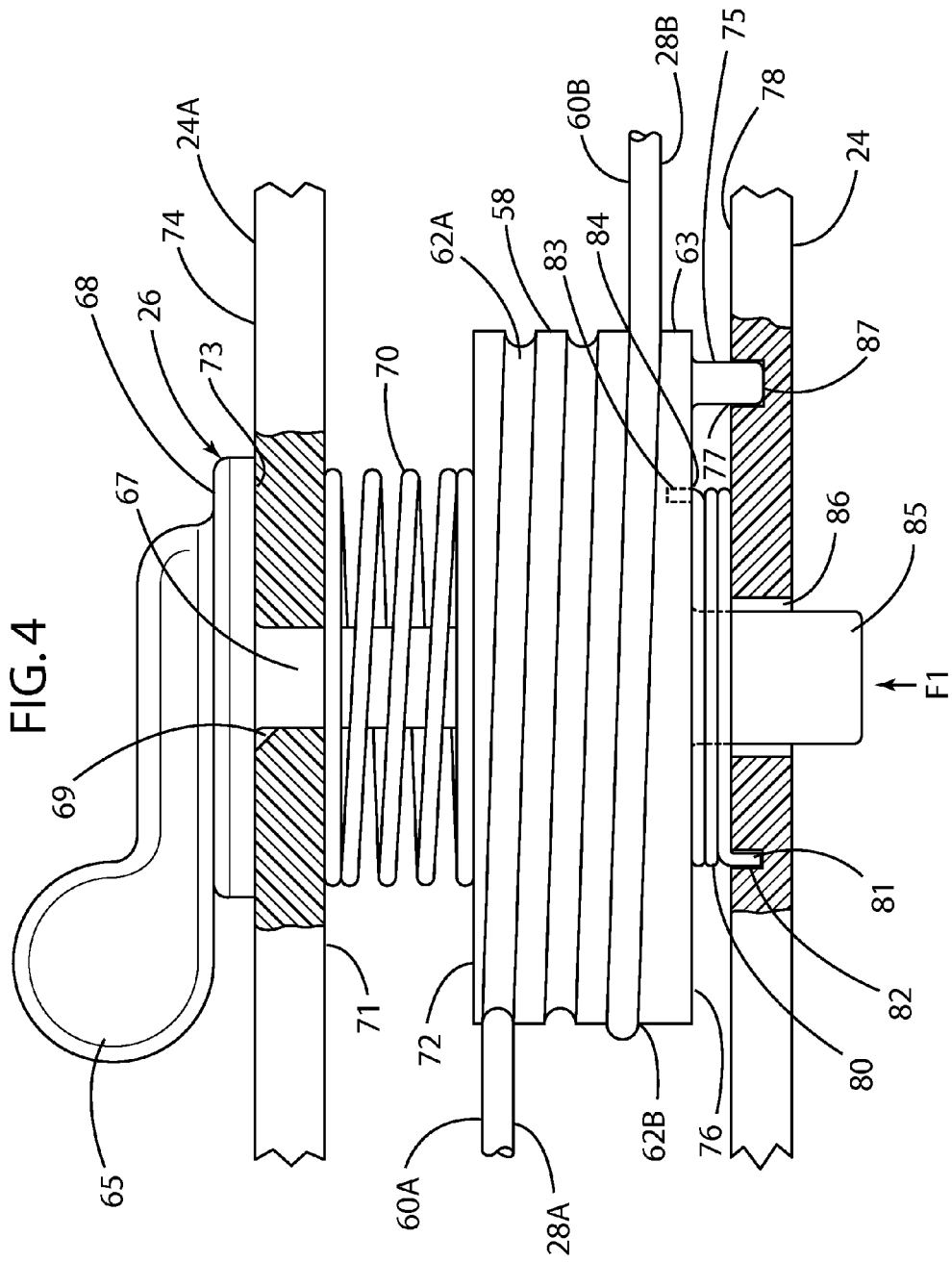

US 8,596,703 B2

RETRACTABLE ROD ENDS FOR LIFTGATE MOUNTED CARGO SHADE

FIELD OF THE INVENTION

The present invention generally relates to cargo shades for motor vehicles.

BACKGROUND OF THE INVENTION

Sport utility vehicles typically include a rear cargo area that can be accessed by opening a rear hatch that swings upwardly. Sight shields or "shades" that extend over the load compartment or cargo area have been developed. Such shades are employed to prevent the viewing of items stored within the vehicle. Known cargo shades employ elongated spring-loaded rollers which may be mounted to the interior quarter trim panels of the vehicle. Unfortunately, this mounting arrangement has proven to be cumbersome in some instances. Known shades may also suffer from various other drawbacks.

SUMMARY OF THE INVENTION

A retractable cover arrangement or assembly for vehicles according to one aspect of the present invention is configured to be used in vehicles having an interior cargo space. The cover assembly includes a vehicle interior space defined by vehicle interior components such as quarter trim panels. The vehicle interior components have spaced-apart connectors adjacent the vehicle interior space. The connector may comprise wedge-shaped openings or other suitable connector. The cover assembly further includes an elongated roller rotatably mounted adjacent the interior space, and a thin flexible cover connected to the elongated roller. The cover includes an inner edge portion that is connected to the elongated roller, whereby at least a portion of the cover can be wrapped around the elongated roller. The cover can be moved from a stowed position wherein the cover is wound onto the roller, and an extended position wherein a second edge portion of the cover is spaced apart from the roller, and wherein a substantial portion of the thin flexible cover extends away from the elongated roller and closes off at least a substantial portion of the interior space. The cover assembly further includes an elongated rod assembly connected to an outer edge of the cover. The rod assembly has a central portion and opposite end portions that shift inwardly and outwardly between extended and retracted positions, respectively, relative to the central portion of the elongated rod assembly. The cover assembly further includes a refraction member operably connected to the opposite end portions of the elongated rod assembly. The retraction member shifts the opposite end portions from their extended positions to their retracted positions upon movement of the retraction member.

The central portion of the elongated rod assembly may comprise a housing, and the retraction member may comprise a spool that is rotatably mounted to the housing. The cover assembly may include elongated cables having inner ends that are wound around the spool, and outer ends that are connected to the opposite end portions of the elongated rod assembly, such that rotation of the pulley creates tension on the cables and pulls the opposite end portions inwardly. A pawl may be utilized to retain the pulley in a rotated position to retain the end portions of the elongated rod assembly in their retracted positions. The pulley may be rotatably biased to generate tension on the cables, and springs or the like may be utilized to generate a bias acting on the end portions of the elongated rod assembly, thereby biasing the end portions towards their extended positions. The elongated rod assembly may include tube members that extend outwardly from the housing, and form oppositely facing openings and the ends of the tubes. The end portions of the elongated rod assembly may comprise a pin and a disk, wherein the pins are received in the openings of the tubes. Compression springs may be utilized to bias the end portions outwardly towards their extended positions.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4 is a cross-sectional view of a central portion of the housing taken along the line IV-IV (FIG. 1).

DETAILED DESCRIPTION OF THE PREFERRED EMBODIMENTS

Figure 1:
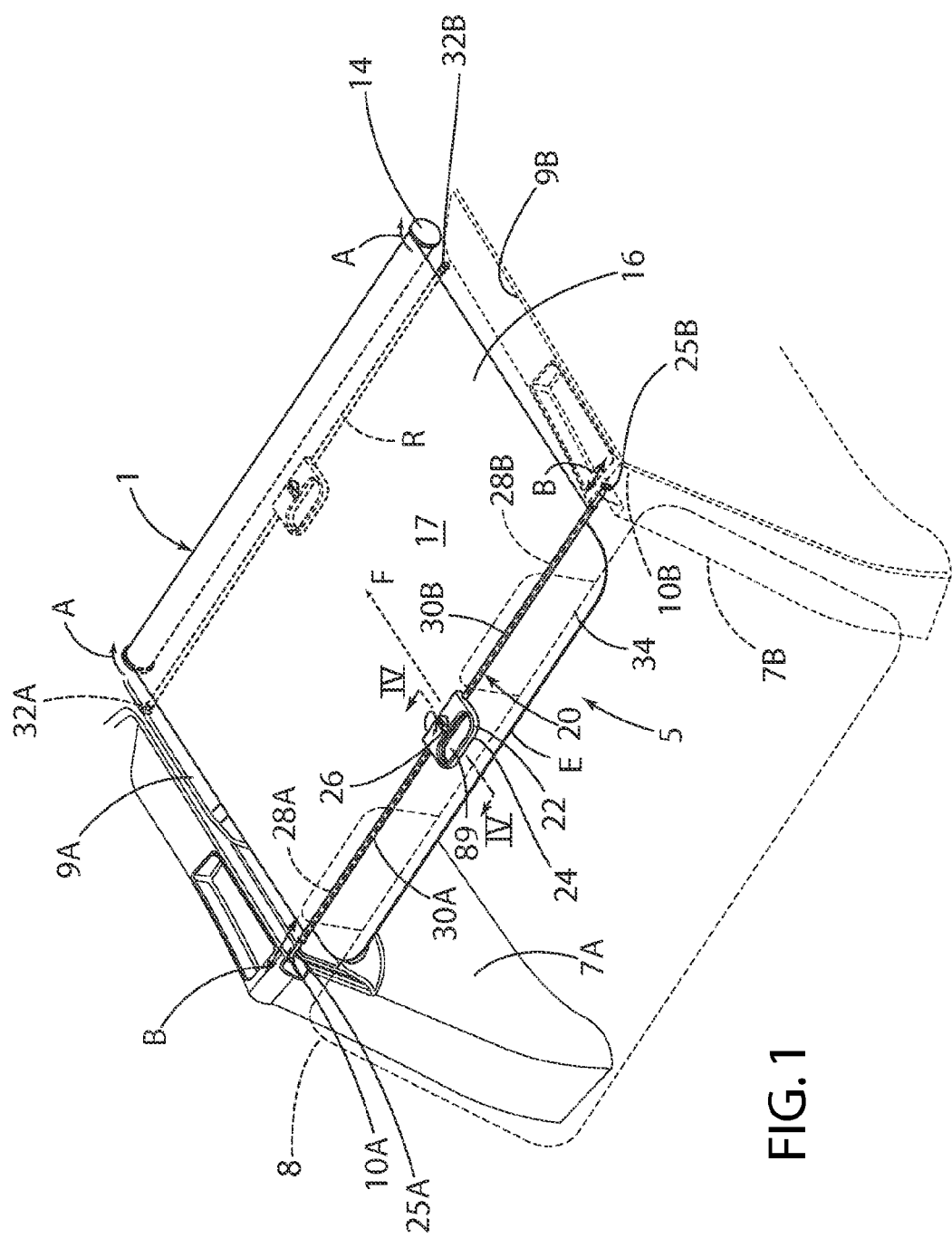
FIG. 1 is a fragmentary isometric view of a portion of a vehicle and cargo shade with retractable rod ends according to one aspect of the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

With reference to FIG. 1, a cargo shade or cover assembly 1 according to one aspect of the present invention includes a vehicle interior cargo space 5 that is defined by vehicle interior components such as interior trim quarter panels 7A and 7B, rear vehicle seats 8, an interior side of a liftgate (not shown) and/or other interior components. The interior components 7A and 7B include connectors 10A and 10B, respectively. As described in more detail below in connection with FIG. 2, connectors 10A and 10B may comprise generally V-shaped cavities 11, and may be mirror images of each other.

Referring again to FIG. 1, the cargo cover assembly 1 also includes an elongated roller 14 that is mounted to the liftgate of the vehicle. A thin flexible sheet 16 may be wound around the elongated roller 14. The elongated roller 14 may be torsionally biased by a spring or the like (not shown) to generate tension acting on sheet 16 tending to pull the sheet 16 rearward (relative to the vehicle) in the direction of the arrow "F" towards the liftgate of the vehicle. The elongated roller 14 and sheet 16 may be substantially similar to the cargo shade and related components disclosed in US Patent Publication No. 2011/0048658 entitled "CARGO SHADE FOR AUTOMATIVE VEHICLE," filed on Sep. 3, 2009, the entire contents of which are incorporated herein by reference. As discussed in more detail in the '658 application, roller 14 may be mounted to the liftgate of a vehicle such that sheet 16 extends and retracts in opposite directions relative to conventional cargo shades. The thin flexible sheet 16 can be moved from a stowed position "R" shown in dashed lines wherein the cover 16 is wound onto the roller 14, and an extended position "E" wherein a substantial portion 17 of the thin flexible cover or sheet 16 extends away from the elongated roller 14 and closes off a substantial portion of the interior cargo space 5.

The cover assembly 1 further includes an elongated rod assembly 20 having a central portion 22 that may include a housing 24. The rod assembly 20 includes tubular portions 30A and 30B that extend outwardly in opposite directions from housing 24. Rod assembly 20 also includes opposite end portions 25A (see also FIG. 2) and 25B that shift inwardly and outwardly as indicated by the arrows "B" between extended and retracted positions relative to the central portion 22 of elongated rod assembly 20. A retraction member such as a pulley 26 is operably connected to the opposite end portions 25A and 25B by elongated cables 28A and 28B that extend through the tubular portions 30A and 30B of rod assembly 20. As discussed in more detail below, rotation of pulley 26 shifts the cables 28A and 28B, thereby pulling the end portions 25A and 25B from an extended position "P1" (FIG. 2), to a retracted position "P2."

When the end portions 25 are in their extended positions, they can be received in the connectors 10A and 10B, respectively, to retain the cover 16 in the extended position E (FIG. 1). Connectors 10A and 10B are preferably located adjacent vehicle seats 8. When the pulley 26 is rotated, it pulls the opposite end portions 25A and 25B inwardly to their retracted positions, thereby reducing the overall length of the rod assembly 20. When 25A and 25B are retracted, the opposite ends 32A and 32B of the rod assembly 20 can be positioned between the inner surfaces 9A and 9B, respectively, of vehicle interior components 7A and 7B. The cover assembly 1 may also include a flap 34 that extends forwardly from housing 24 and tubes 30A and 30B. The flap 34 may be made of the same material as the cover sheet 16, or it may comprise a somewhat stiffer layer of material. Flap 34 is configured to fit closely along the rear side of vehicle seats 8. The flap 34 is preferably somewhat flexible to permit the rod assembly 20 to be moved forwardly in a vehicle (i.e. opposite the direction of the arrow "F"), thereby deforming or bending the flap 34 somewhat upon contact with vehicle seats 8.

Figure 2:
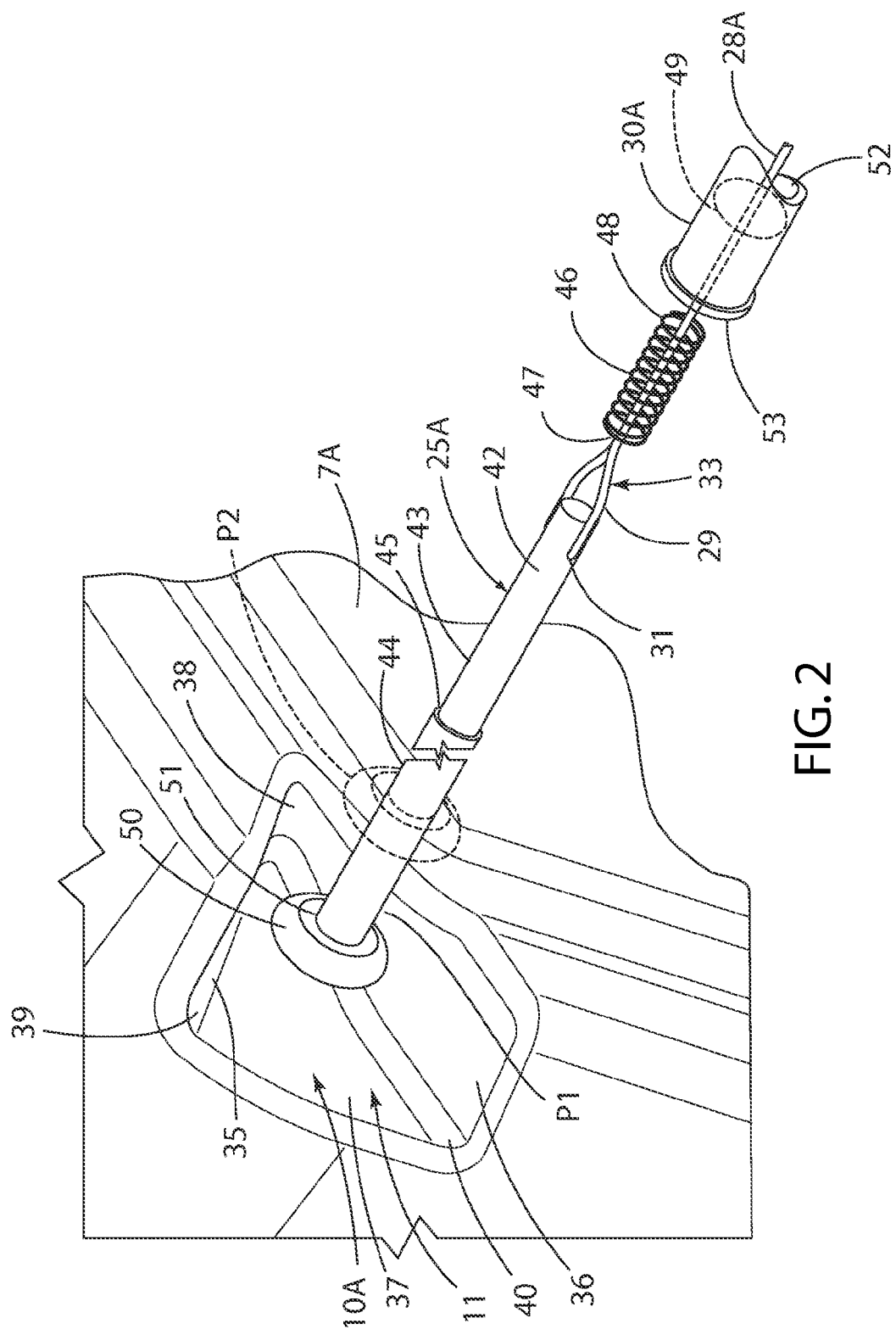
FIG. 2 is a fragmentary, enlarged view of a portion of the cargo shade assembly of FIG. 1.

Connector 10A is a mirror image of connector 10B (FIG. 1). Accordingly, only connector 10A is described herein. With further reference to FIG. 2, connector 10A includes a V-shaped cavity 11. The V-shaped cavity 11 is formed by tapered upper surface 35, lower surface 36, and side surface 37. Surfaces 35 and 36 taper towards one another, and join together to form root 38 of the V-shape 38. The side surface 37 is generally vertical, and has a shape that is similar to a triangle or a "pie" shape. Side surface 37 intersects upper surface 35 to define an upper corner 39, and surface 37 intersects lower surface 36 to form a lower corner 40.

End portion 25A includes a generally cylindrical pin 42 having an inner portion 43, an outer portion 44, and a transverse annular surface 45. When assembled, inner portion 43 of pin 42 is telescopically received in open end 53 of tube 30A, and a helical spring 46 is received on the inner portion 43 of pin 42. Outer end 47 of spring 46 bears against the annular transverse surface 45, and inner end 48 of spring 46 bears against an annular surface 49 inside tube 30 to thereby bias the end portion 25 outwardly. A disc or roller 50 may be mounted on an outer end 51 of pin 42. Disc 50 may be rotatably mounted to pin 42 to provide rolling contact with surfaces 36 and 37 of cavity 11 as disc 50 is moved into the cavity 11.

Cable 28A includes a looped outer end 29 that extends through a transverse opening 31 in pin 42 to thereby connect the end 33 of cable 28A to end portion 25A. Tube 30A forms an elongated internal passageway 52 extending from open end 53 of tube 30A to housing 24, and cable 28A is disposed in passageway 52 of tube 30A. Cable 28B (FIG. 1) is similarly disposed inside tube 30B. As discussed below in connection with FIG. 3, inner ends 60A and 60B of cables 28A and 28B are connected to pulley 26.

Figure 3:
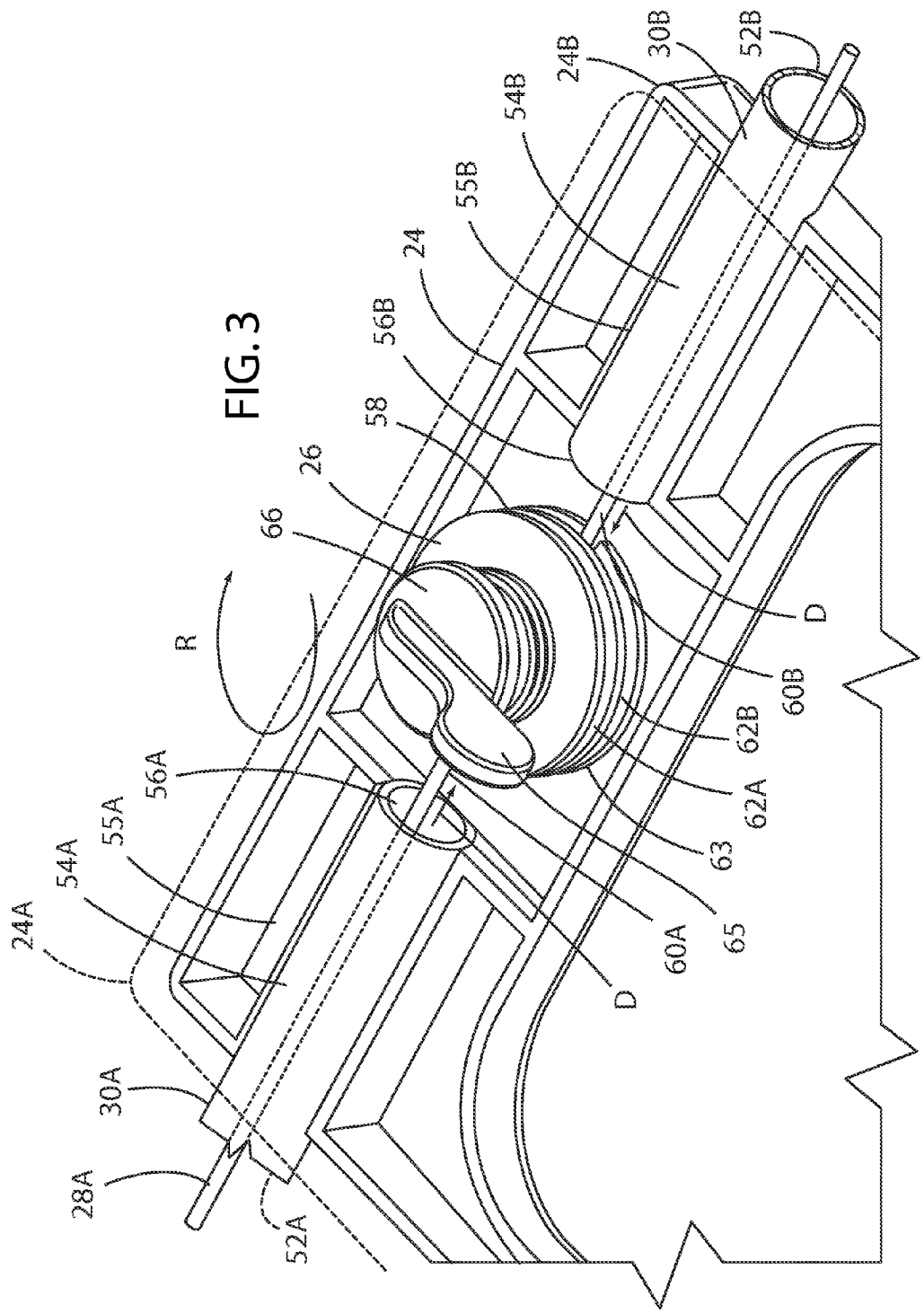
FIG. 3 is a fragmentary, enlarged view of a portion of the cargo shade assembly of FIG. 1.

With further reference to FIG. 3, inner end portion 54A of tube 30A is received in connecting portion 55A of housing 24, and end portion 54B of tube 30B is received in connecting portion 55B of housing 24. Cables 28A and 28B extend outwardly from open inner ends 56A and 56B, respectively, of tubes 30A and 30B. Housing 24 may include a cover member 24A that extends over a base portion 24B of housing 24.

Inner end portions 60A and 60B of cables 28A and 28B, respectively, wrap around a generally cylindrical portion 58 of pulley 26. End portions 60A and 60B are received in first and second outwardly facing helical grooves 62 that are formed in outer surface 63 of cylindrical portion 58 of pulley 26. Rotation of pulley 26 as shown by the arrow "R" causes the end portions 60A and 60B of cables 28A and 28B, respectively, to wind onto pulley 26, thereby shifting the cables 28A and 28B inwardly as shown by the arrows "D." A handle or tab 65 protrudes from upper end 66 of pulley 26, and permits a user to manually grasp and rotate pulley 26.

With further reference to FIG. 4, pulley 26 includes a shaft 67 that interconnects an outer disc portion 68 to the cylindrical portion 58. The handle or tab 65, disc 68, shaft 67, and cylindrical portion 58 may be integrally formed. Shaft 67 extends through an opening 69 in housing 24A. A helical compression spring 70 extends between an inner surface 71 of housing part 24A and surface 72 of cylindrical portion 58 of pulley 26. Spring 76 biases pulley 26 downwardly into the position shown in FIG. 4 wherein lower surface 73 of disc portion 68 of pulley 26 slidably contacts outer surface 74 of housing member 24A.

A protrusion such as a boss 75 extends from an outer or end surface 76 of cylindrical portion 58 of pulley 26. When the pulley 26 is in the position shown in FIG. 4, the boss 75 is received in a bore or cavity 77 formed in inwardly-facing surface 78 of housing 24. A torsion spring 80 includes a first end 81 that is received in a bore or opening 82 in housing 24, and a second end 83 that is received in a bore or opening 84 of cylindrical portion 58 of pulley 26. The torsion spring 80 generates a bias acting on pulley 26 that tends to tension the cables 28A and 28B. However, the force generated by torsion spring 80 is not sufficient (by itself) to overcome the outward bias generated by helical springs 46 (FIG. 2).

Referring again to FIG. 4, a push button 85 extends through opening 86 in housing 24, and protrudes outwardly therefrom. In use, when the cover 16 is in the extended position, the opposite ends 25 (FIG. 1), are extended and engage V-shaped cavities 11 of connectors 10. If a user wishes to move the rod assembly 20 from the extended position "E" to the retracted position "R," he/she grasps handle portion 89 (FIG. 1) of housing 24, and pulls the rod assembly 20 and flexible cover sheet 16 forwardly in the vehicle (i.e. opposite the direction of the arrow "F"), thereby shifting the opposite end portions 25A and 25B or rod assembly 20 out of engagement with V-shaped cavities 11 formed in interior components 7A and 7B. The user then grasps the handle 65 and rotates it to retract the opposite end portions 25 into the tubular portions 30. As the pulley 26 is rotated, the cables 28A and 28B wrap around cylindrical portion 58 of pulley 26, and are received in helical grooves 62A and 62B. End surface 87 of extension 75 of pulley 26 may slide along inner surface 78 of housing 24 as the pulley 26 is rotated. As discussed above, compression spring 70 generates a force on pulley 26 tending to shift boss or extension 75 into engagement with bore or cavity 77 and/or surface 78 of housing 24. When the pulley 26 is sufficiently rotated to pull the opposite end portions 25A and 25B to the retracted position, the boss or protrusion 75 snaps into bore or opening 77 in housing 24, thereby retaining opposite end portions 25 of rod assembly 20 in the retracted position.

After the opposite end portions 25 are retracted, a user can then move the housing 24 and rod assembly 20 towards the retracted position "R" (FIG. 1). Biasing torque of elongated roller 14 causes the thin flexible cover sheet 16 to wind onto elongated roller 14. The elongated roller 14 may be mounted on a vehicle interior component, or it may be mounted on a lift gate of a vehicle.

To shift the cover assembly from the retracted position "R" to the extended position "E," a user grasps the handle portion 89 of housing 24, and shifts the housing 24 and elongated rod assembly 20 to a position wherein the opposite end portions 25A and 25B are directly adjacent the V-shaped cavities 11 of connectors 10 of vehicle interior components 7A and 7B. A user then applies an axial force "F1" (FIG. 4) on push button 85. This causes pulley 26 to shift axially, thereby shifting the boss or protrusion 75 out of bore or cavity 77 in housing 24. Pulley 26 will then rotate and unwind the cable end portions 60A and 60B due to the force acting on the cables due to compression springs 46 (FIG. 2). A user can allow the cables 28A and 28B to unwind by themselves due to the force of spring 46, or a user can grasp handle 65 of pulley 26 and control the outward movement of opposite end portions 25A and 25B. Once the cables 28A and 28B have been fully extended (i.e. further rotation of pulley 26 does not further shift the cables 28A and 28B outwardly), the opposite end portions 25 will stop in the extended positions. A user can then shift the opposite end portions 25A and 25B forwardly into the V-shaped cavities 11A and 11B to retain the cover in the extended position wherein the cover closes off at least a substantial portion of the vehicle interior space 5.

It is to be understood that variations and modifications can be made on the aforementioned structure without departing from the concepts of the present invention, and further it is to be understood that such concepts are intended to be covered by the following claims unless these claims by their language expressly state otherwise.

I claim:

1. A retractable cover arrangement for vehicles having an interior cargo space, the retractable cover arrangement comprising:
 a vehicle interior space defined by vehicle interior components having spaced-apart connectors adjacent the vehicle interior space;
 an elongated roller rotatably mounted adjacent the interior space;
 a thin flexible cover having inner and outer opposite edge portions, the thin flexible cover wrapping around the elongated roller such that the cover can be moved from a stowed position wherein the cover is wound onto the roller, and an extended position wherein a substantial portion of the thin flexible cover extends away from the elongated roller with the outer end spaced apart from the roller, and wherein the thin flexible cover closes off a substantial portion of the interior space;
 an elongated rod assembly connected to the thin flexible cover, the elongated rod assembly having a central portion and opposite end portions that shift inwardly and outwardly between extended and retracted positions, respectively, relative to the central portion;
 a retraction member operably connected to the opposite end portions and shifting the opposite end portions from their extended positions to their retracted positions upon movement of the retraction member.

2. The retractable cover arrangement of claim 1, wherein:
the opposite end portions are biased outwardly towards their extended positions.

3. The retractable cover arrangement of claim 2, wherein:
the retraction member is rotatably mounted to the central portion of the elongated rod assembly; and including:
at least one elongated member operably interconnecting the retraction member to at least one of the opposite ends, such that rotation of the retraction member shifts the one opposite end inwardly from its extended position to its retracted position.

4. The retractable cover arrangement of claim 3, wherein:
the one elongated member comprises a first elongated cable portion that wraps around the retraction member; and including:
a second elongated cable portion that wraps around the retraction member; and wherein:
rotation of the retraction member causes the opposite end portions to shift between their extended and retracted positions.

5. The retractable cover arrangement of claim 4, wherein:
the central portion of the elongated rod assembly comprises a housing and first and second tube structures extending in opposite directions from the housing:
the first and second cables extend through the first and second tube structures, respectively.

6. The retractable cover arrangement of claim 5, wherein:
the retraction member is rotatably biased in such a way that the first and second cables are pre-tensioned due to the rotary bias of the retraction member.

7. The retractable cover arrangement of claim 6, including:
a releasable retainer that selectively retains the retraction member in a first rotated position wherein the opposite end portions are in their retracted positions.

8. The retractable cover arrangement of claim 7, wherein:
the retainer comprises a boss disposed on one of the housing and the retraction member, and a retaining surface on the other of the housing and the retraction member, and wherein engagement of the boss with the retaining surface prevents rotation of the retraction member in a direction opposite that of the rotational bias of the retraction member.

9. The retractable cover arrangement of claim 8, wherein:
the retraction member defines an axis of rotation, and wherein:
the retraction member is movably mounted to the housing and moves axially in the direction of the axis relative to the housing.

10. The retractable cover arrangement of claim 9, wherein:
the boss is disposed on the retraction member, and the retaining surface defines an inwardly-facing bore in the housing;
the boss selectively engages the bore upon axial movement of the retraction member, and wherein:
the retraction member is axially biased in a manner tending to cause the boss to be received in the bore when the boss is aligned with the bore.

11. The retractable cover arrangement of claim 10, wherein:
the retraction member includes a spool portion having first and second outwardly-facing helical grooves that receive the first and second cables.

12. The retractable cover arrangement of claim 11, wherein:
the first and second tube structures define first and second end openings, respectively;
the opposite end portions of the elongated rod assembly comprise first and second rod end members having elongated portions movably received in the first and second end openings, respectively, and wherein the first and second rod end members are connected to the first and second cables, respectively.

13. The retractable cover arrangement of claim 12, wherein:
the vehicle interior components are part of a motor vehicle having a front and a rear, and a liftgate at the rear of the vehicle that pivots between an upper open position and a lower closed position to selectively close off an enlarged rear opening of the motor vehicle;
the spaced-apart connectors of the vehicle interior components comprise tapered surfaces that open towards the front of the motor vehicle to form tapered cavities;
the first and second rod end members are received in the tapered cavities to retain the cover in the extended position.

14. The retractable cover arrangement of claim 13, wherein:
the cavities define forwardly-facing openings, wherein the cavities are further defined by inner surfaces that intersect first edge portions of the tapered surfaces along corner intersections that are generally V-shaped, the openings of the cavities further including inwardly-opening V-shaped portions that are joined with the forwardly-facing openings, and wherein the rod end members are received in the cavities in engagement with the tapered surfaces, with the end members extending through the inwardly-opening V-shaped portions.

15. The retractable cover arrangement of claim 14, wherein:
the roller is mounted to a liftgate of a motor vehicle and moves through an arc relative to the cavities.

16. A cover for vehicles, comprising:
an elongated rod having opposite ends telescopically receiving outwardly-biased movable connectors;
a rotationally biased roller;
a thin flexible sheet having one edge wrapped around the roller and an opposite edge attached to the rod;
a spool rotatably mounted to a center of the elongated rod;
cables engaging the spool and the connectors;
a pawl retaining the spool and connectors in a retracted position.

17. The cover for vehicles of claim 16, wherein:
the spool is biased by a torsional spring and tensions the cables and thereby generates a force tending to shift the connector inwardly.

18. The cover for vehicles of claim 17, wherein:
the center of the elongated rod comprises a housing having an opening;
the spool shifts axially relative to the housing;
the pawl comprises a protrusion on the spool that selectively engages the opening in the housing upon axial shifting of the spool; and wherein:
the spool is axially biased such that the protrusion is biased into the opening in the housing when the protrusion is aligned with the opening.

19. The cover for vehicles of claim 16, wherein:
the elongated rod includes a housing at the center of the rod, and elongated tubular structures extending outwardly from the housing in opposite directions, the tubular structures having openings at outer ends thereof;
the spool is rotatably mounted to the housing;
each connector comprises a pin and a disk-shaped outer end, wherein the pins are telescopically received in the openings of the tubular structure;
the cables extend through the tubular structures and connect to the pins of the connectors;
and include:
helical compression springs having opposite ends engaging the tubular structures and the connectors and biasing the connectors outwardly.

20. The cover for vehicles of claim 16, wherein:
the spool includes first and second outwardly-facing helical grooves; and
the cables comprise first and second cables having inner end portions;
the inner end portions of the first and second cables are received in the first and second grooves, respectively.

* * * * *